(12) United States Patent
Hofmann

(10) Patent No.: US 7,445,234 B2
(45) Date of Patent: Nov. 4, 2008

(54) FOAMED BODY FOR THE PRODUCTION OF A SEAT OF AN AUTOMOBILE WITH AIRBAG MODULE

(75) Inventor: Manfred Hofmann, Hettstadt (DE)

(73) Assignee: F.S. Fehrer Automotive Foam GmbH, Kitzingen (DE)

( * ) Notice: Subject to any disclaimer, the term of this patent is extended or adjusted under 35 U.S.C. 154(b) by 401 days.

(21) Appl. No.: 11/229,987

(22) Filed: Sep. 19, 2005

(65) Prior Publication Data

US 2006/0066078 A1    Mar. 30, 2006

(30) Foreign Application Priority Data

Sep. 24, 2004    (DE) .................. 10 2004 046 666
Oct. 22, 2004    (DE) .................. 10 2004 051 663

(51) Int. Cl.
*B60R 21/207*    (2006.01)
(52) U.S. Cl. .............. 280/730.2; 280/728.1; 280/730.1; 280/737
(58) Field of Classification Search ............. 280/728.1, 280/730.1, 730.2, 737; *B60R 21/207*
See application file for complete search history.

(56) References Cited

U.S. PATENT DOCUMENTS

| | | | |
|---|---|---|---|
| 4,500,581 A * | 2/1985 | Mitomi et al. | 428/85 |
| 5,678,853 A * | 10/1997 | Maly | 280/730.2 |
| 5,860,673 A * | 1/1999 | Hasegawa et al. | 280/730.2 |
| 5,863,063 A * | 1/1999 | Harrell | 280/730.2 |
| 5,906,390 A * | 5/1999 | Phillion et al. | 280/728.3 |
| 5,927,749 A * | 7/1999 | Homier et al. | 280/730.2 |
| 6,045,151 A * | 4/2000 | Wu | 280/728.3 |
| 6,206,466 B1 | 3/2001 | Komatsu | |
| 6,227,010 B1 | 5/2001 | Roell | |
| 6,352,304 B1 * | 3/2002 | Sorgenfrei | 297/216.13 |
| 6,401,496 B1 | 6/2002 | Roell | |
| 2002/0190509 A1 * | 12/2002 | Higashi | 280/730.2 |
| 2004/0130130 A1 * | 7/2004 | Bossecker et al. | 280/730.2 |

FOREIGN PATENT DOCUMENTS

| | | |
|---|---|---|
| DE | 196 36 208 A1 | 3/1998 |
| DE | 198 47 333 C2 | 4/2000 |
| DE | 697 02 026 | 5/2000 |
| DE | 199 15 831 | 10/2000 |
| EP | 0819587 | 5/2000 |
| JP | 2003227037 A * | 8/2003 |

* cited by examiner

*Primary Examiner*—Christopher Ellis
*Assistant Examiner*—Jacob Meyer
(74) *Attorney, Agent, or Firm*—McGlew & Tuttle, P.C.

(57) ABSTRACT

A foamed body (03) for the production of a seat of an automobile (01) has at least one airbag module (07), which is integrated into the lateral area of the seat (01). The airbag module (07) includes an expandable airbag (09) and a gas generator (08). The seat (01) has at least one normally closed exit opening (12), through which the airbag (09) can be expanded. The foamed body (03) has a cavity (06), and/or a recess, in which the non-expanded airbag (09) can be at least partially received.

1 Claim, 3 Drawing Sheets

FOAMED BODY FOR THE PRODUCTION OF A SEAT OF AN AUTOMOBILE WITH AIRBAG MODULE

CROSS REFERENCE TO RELATED APPLICATIONS

This application claims the benefit of priority under 35 U.S.C. § 119 of German Application DE 10 2004 046 666.1 filed Sep. 24, 2004 and German Application DE 10 2004 051 663.4 filed Oct. 22, 2004. The entire contents of each application is incorporated herein by reference.

FIELD OF THE INVENTION

A seat of an automobile with side airbag is known from DE 199 15 831 A1. The airbag module with expandable airbag and gas generator is integrated in the lateral side rest area, and upholstered with a foamed body and an upholstery material. The folded airbag of the airbag module is stored in a dimensionally stable housing, which bursts open at one edge when the airbag expands, thus forming an open exit channel, through which the expanded airbag can extend toward the exterior.

BACKGROUND OF THE INVENTION

A disadvantage of this design is that the user's seating comfort may be adversely affected by the rigid housing of the airbag module, because the contour of the housing pushes through the foamed upholstery. Additionally, the re-upholstery of such seats of an automobile becomes more difficult as airbag modules are normally provided on one side only of the seat of an automobile, and asymmetric reference tension results from the housing provided in the foamed upholstery.

SUMMARY OF THE INVENTION

It is therefore the object of the present invention to propose a new foamed body for the production of a seat of an automobile with an airbag module, which overcomes the disadvantages of the known prior art.

According to the invention, a foamed body is provided for the production of a seat of an automobile with at least one airbag module, which is integrated into the lateral area of the seat. The airbag module comprises an expandable airbag and a gas generator. The seat has at least one normally closed exit opening, through which the airbag can be expanded. The design according to the invention is based on the principle of providing a cavity, and/or a recess within the foamed body, in which the non-expanded airbag is received. Due to the arrangement of the airbag in the cavity, or recess, respectively, of the foamed body, a separate housing for receiving the airbag may be omitted, thus improving the seating comfort significantly.

In order to prevent any undesired unfolding of the airbag in the cavity, or recess, respectively, of the foamed body, it is of particular advantage if fixing elements, such as tensioning belts, are available, through which the non-expanding airbag is held together. This measure additionally simplifies the handling of the airbag module significantly during the installation into a seat of an automobile.

According to the invention, an inflexible housing for surrounding the non-expanded airbag can be omitted. However, to all intents and purposes it is possible that the airbag is packed into other repositories, such as plastic foil. As an alternative, however, it is of particular advantage if the expanded airbag comes to rest in the cavity, or recess, respectively, of the foamed body, directly at the interior surface.

Insofar as a cavity is provided in the foamed body for receiving the airbag it is necessary during the expansion of the airbag that a continuous recess is created in the foamed body, through which the airbag may exit toward the exterior. In order to facilitate the forming of this recess within the foamed body with an expanding airbag the foamed body should have a target rupture zone that corresponds with the position of the exit opening, which is defined, for example, by a target rupture location in the upholstery material.

In order to guide the airbag during the expansion in the direction of the exit opening, the foamed body should have an exit channel, through which the expanding airbag reaches. This exit channel can either be formed by walls of the cavity, or recess, respectively, provided in the foamed body, or can be created when the foam material is torn open while the airbag exits.

The sudden expanding of the airbag during the release of the airbag module may damage the foam material of the foamed body in the contact area so that particles are torn out from the foamed body, and catapulted into the interior of the automobile as so-called "airborne foam particles." Such airborne foam particles represent an additional risk of injury for the passengers of an automobile. In order to reduce, or completely eliminate such airborne foam particles with an expanding airbag, the area of the exit channel may be reinforced, at least in some areas, with a reinforcement element. The foam material is supported by means of the reinforcement element, thus largely avoiding the tearing out of foam particles.

A particularly good protective effect of the reinforcement element is achieved if the reinforcement element is foamed into the foam material.

Furthermore, it is of particular advantage if the reinforcement element is elastically deformable. This is of significance particularly if the exit channel is partially formed only with the tearing open of the foam material during the expansion of the airbag. For up to the point when the rupture threshold of the foam material is achieved, the surrounding foam material must elastically deform, whereas it can separate from the surface of the reinforcement element when using inelastic reinforcement elements, and would thereby be exposed again. Elastic reinforcement elements on the other hand, can follow the deformation of the foamed body up to the point of achieving the rupture threshold without the foam material separating from the reinforcement element to any substantial extent.

Any type of material is generally suitable for the production of the reinforcement element. For example, non-woven fabric, or plastic screens may be used, which are foamed into the foam material during the production of the foamed body.

A particularly great protective effect against airborne foam particles is achieved if knitted elements or web elements are used as reinforcement elements. These knitted or web elements are produced by means of knitting and/or weaving of fiber materials, and can be foamed well into the foam material. The seating comfort of the passengers of an automobile is also not affected by such materials.

Tests have shown that in particular knitted fabric elements are particularly well suited as reinforcement elements. Such knitted fabric elements are produced by means of combined knitting and weaving of fiber materials, and are described, for example, in DE 196 36 208 A1 and DE 198 47 333 C2.

In order to simplify the foaming in of the knitted, web, or knitted fabric element during the production of the foamed body, the same should advantageously have a three-dimensional shape that corresponds with the shape of the exit channel. In this manner, the three-dimensional reinforcement element can be inserted into the foaming mold in a simple manner, and foamed in place by the foam material. The three-dimensional reinforcement element should preferably have an opening, through which the expanding airbag can reach. In this manner, the tearing open of the reinforcement element during the expansion of the airbag, for which substantial forces would be necessary, is avoided.

One embodiment of the invention is schematically illustrated in the drawings, and will be explained in detail below.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
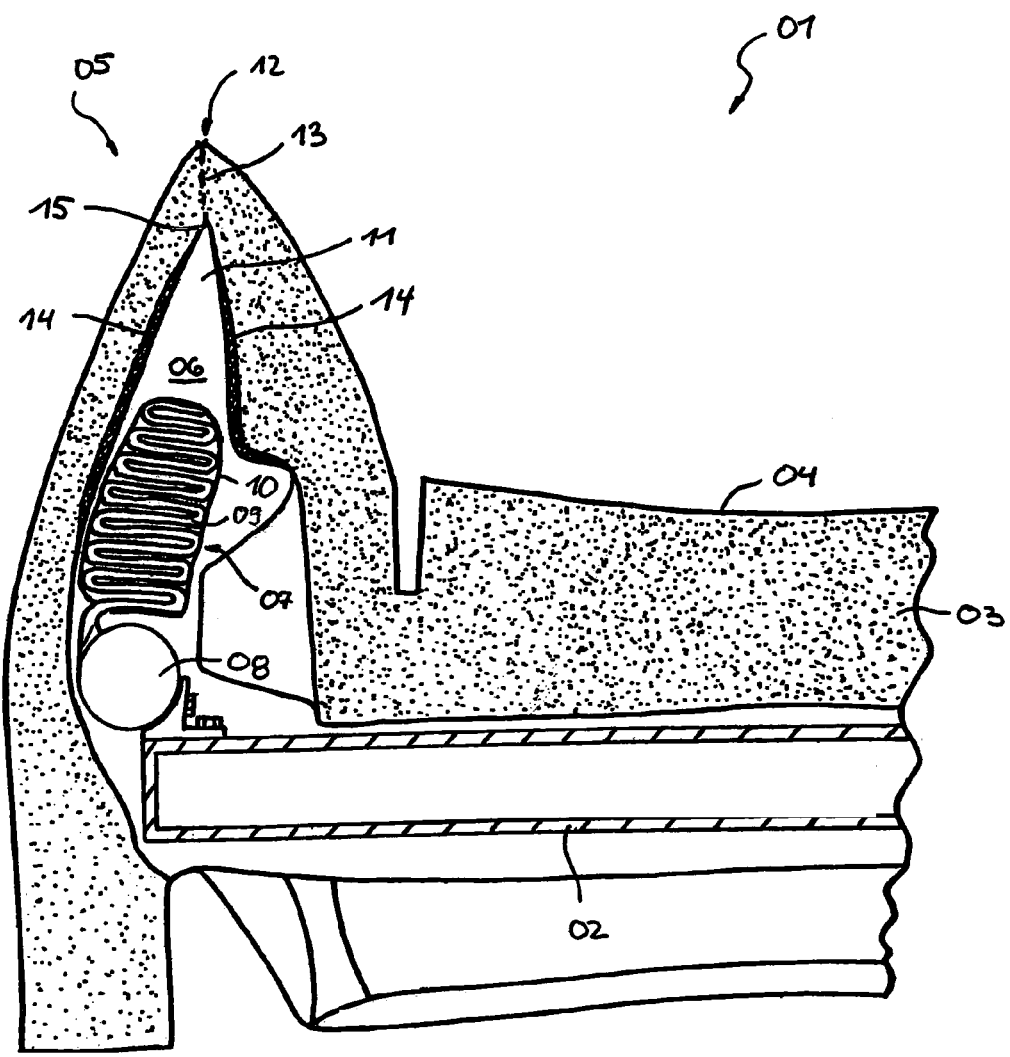
FIG. 1 is a schematic cross sectional view of a seat of an automobile with a non-expanded airbag module.

Referring to the drawings in particular, FIG. 1 shows a seat of an automobile 01 in a schematic cross section, during the production of which a frame 02, which is merely schematically indicated, is upholstered with a foamed body 03 and an upholstery fabric 04. In the area of the side rest 05 the foamed body 03 has a wedge-shaped cavity 06, in which an airbag module 07 is at least partially housed with a gas generator 08 and an airbag 09 that is nonexpanded in a normal state. The airbag 09 is held together by fixing elements 10, namely several tensioning belts, for the fixing of the fold. Aside from the fixing elements 10, the airbag 09 comes to rest directly at 15 the interior surface of the foamed body 03. The upper portion of the cavity 06 forms an exit channel 11, through which upon release of the airbag module 07 the airbag 09 can unfold toward the top in the direction of an exit opening 12 that is closed in the normal state. The exit opening 12 is defined by a seam in the upholstery fabric 04 that is fashioned in 20 the manner of a target rupture point.

The area of the foamed body 04 between the exit opening 12 and the upper end of the cavity 06 is provided as a target rupture zone 13, along which the foam material tears open when the airbag 09 expands.

In order to avoid the tearing out of foam particles from the foamed body 03 during the expansion of the airbag 09, a three-dimensional reinforcement element 14 is foamed into the foam material of the foamed body 03 in the area of the exit channel 11. The reinforcement element 14 has a slot-shaped opening 15 beneath the target rupture zone 13, through which opening the expanded airbag 09 can exit. The reinforcement element 14 extends essentially parallel to the surface of the exit channel 11, and can easily be elastically deformed.

Figure 2:
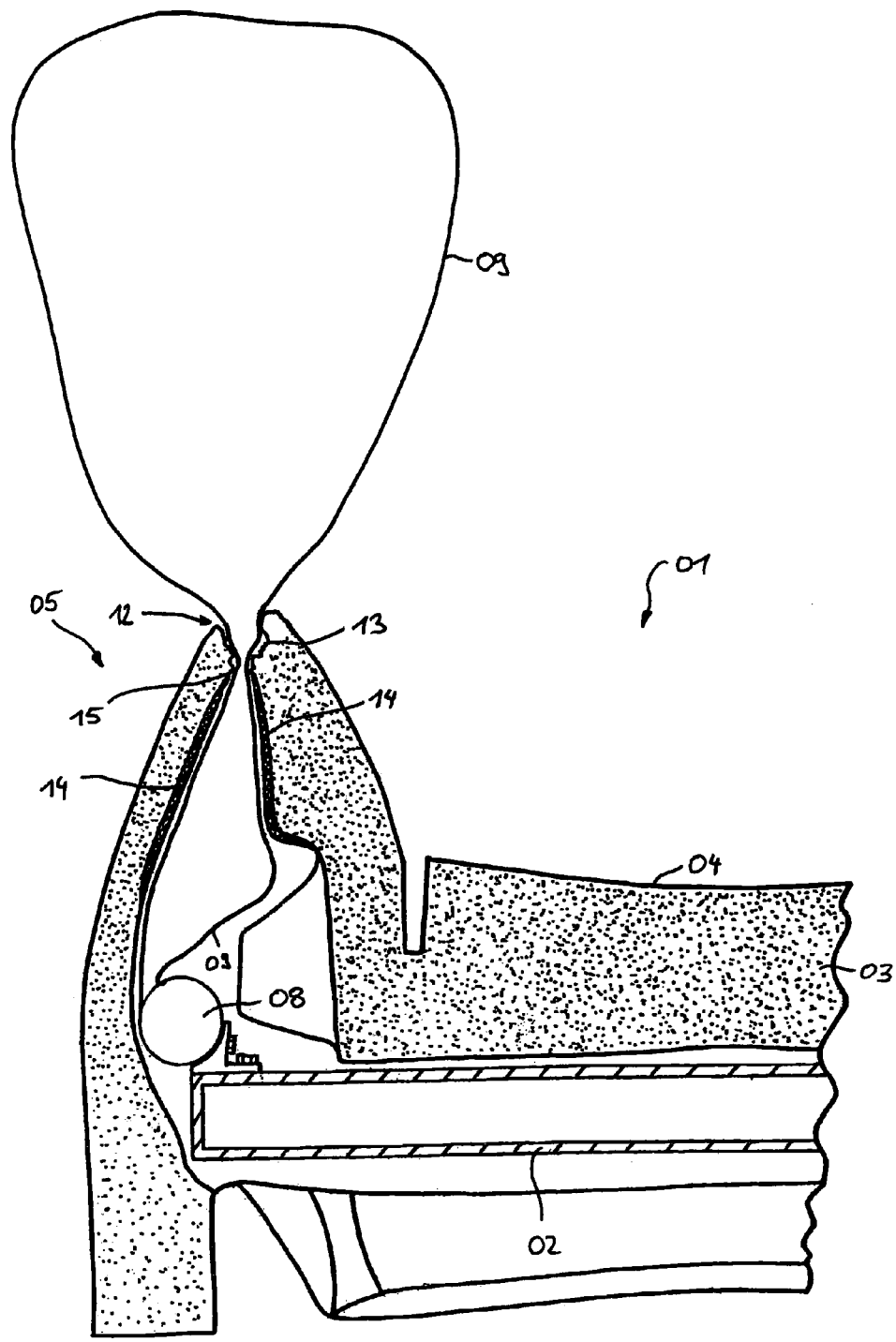
FIG. 2 is a schematic cross sectional view of the seat of an automobile according to FIG. 1 with a released airbag module and an expanded airbag.
Figure 3:
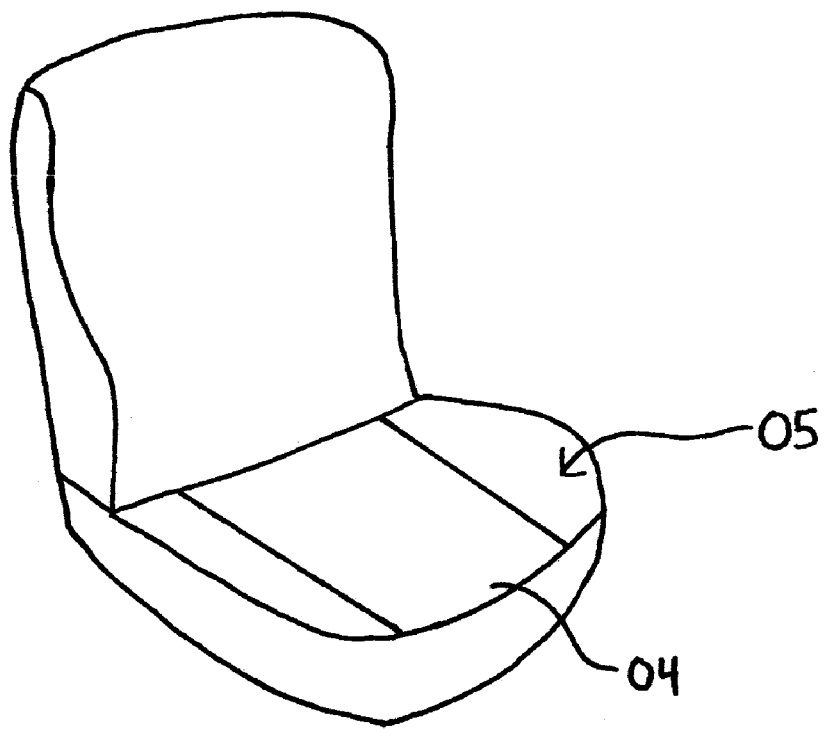
FIG. 3 is a perspective view of the seat of an automobile.

FIG. 2 illustrates the seat of an automobile 01 after the release of the airbag module 07 and subsequent expansion of the airbag 09. The foamed 5 body 03 is torn open in the target rupture zone 13 so that the airbag 09 can exit toward the exterior starting from the cavity 06 through the slotshaped opening 15 in the reinforcement element 14 and through the exit opening 12 in the upholstery fabric 04. The tearing out of foam particles from the surface of the foamed body in the area of the exit channel 12 is largely prevented by means of the reinforcement element 14. It is also possible in particular that the target rupture zone 13 is replaced with a slot in the foamed body 03 so that a tearing out of foam particles during the tearing open of the foamed body 03 in the area of the target rupture zone 13 is avoided.

While a specific embodiment of the invention has been shown and described in detail to illustrate the application of the principles of the invention, it will be understood that the invention may be embodied otherwise without departing from such principles.

What is claimed is:

1. An automobile seat foamed body and airbag, comprising:

a foamed body formed of foam material for defining an automobile seat and with a seat lateral area having an airbag exit opening, said foamed body defining an exit channel;

an airbag module integrated into the seat lateral area, said airbag module comprising an expandable airbag and a gas generator, and wherein the airbag exit opening is normally closed with the airbag positioned to be expanded therethrough, the foamed body having a cavity, in which a non-expanded airbag can be at least partially received, said non-expanded airbag being held together in the cavity of the foamed body by fixing elements in the form of tensioning belts, said airbag extending through said foamed body via said exit channel when said airbag module is released, said exit channel being in communication with said cavity;

a reinforcement element arranged in an area of said exit channel, said reinforcement element reinforcing said foam material of said foamed body, said reinforcement element being foamed in said foam material of said foamed body, said reinforcement element being elastically deformable, said reinforcement element being a knitted fabric element produced by combined knitting and weaving of fiber materials, said reinforcement element having a three-dimensional shape corresponding with a shape of said cavity and a shape of said exit channel, said reinforcement element having a reinforcement element opening, said airbag extending through said reinforcement element opening when said airbag module is released.

* * * * *